United States Patent
Fu

(10) Patent No.: US 11,861,158 B2
(45) Date of Patent: Jan. 2, 2024

(54) MESSAGE PROCESSING METHOD AND ELECTRONIC DEVICE

(71) Applicant: VIVO MOBILE COMMUNICATION CO., LTD., Dongguan (CN)

(72) Inventor: Dan Fu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 6 days.

(21) Appl. No.: 17/733,996

(22) Filed: Apr. 30, 2022

(65) Prior Publication Data
US 2022/0261148 A1 Aug. 18, 2022

Related U.S. Application Data

(63) Continuation of application No. PCT/CN2020/125773, filed on Nov. 2, 2020.

(30) Foreign Application Priority Data
Nov. 8, 2019 (CN) .......................... 201911087411.8

(51) Int. Cl.
*G06F 3/04883* (2022.01)
*G06F 3/04842* (2022.01)
(Continued)

(52) U.S. Cl.
CPC ...... *G06F 3/04883* (2013.01); *G06F 3/04842* (2013.01); *H04L 51/04* (2013.01); *H04L 51/23* (2022.05)

(58) Field of Classification Search
USPC ........................................................ 345/173
See application file for complete search history.

(56) References Cited

U.S. PATENT DOCUMENTS

2009/0193348 A1\* 7/2009 Banks ................. G06F 3/04883
715/764
2011/0304556 A1\* 12/2011 Harris ................. G06F 3/04883
345/173
(Continued)

FOREIGN PATENT DOCUMENTS

CN 103547342 A 1/2014
CN 103558984 A 2/2014
(Continued)

OTHER PUBLICATIONS

Extended European Search Report issued in related European Application No. 20885697.1, dated Dec. 8, 2022, 7 pages.
(Continued)

*Primary Examiner* — Chineyere D Wills-Burns
(74) *Attorney, Agent, or Firm* — IPX PLLC

(57) ABSTRACT

A method for message processing and an electronic device are provided. The method for message processing performed by a transmit end device includes: receiving a first gesture input performed on a first message content, where the first gesture input is a gesture corresponding to a preset modifier; determining a first modification manner corresponding to the first gesture input in response to the first gesture input, and performing a first modification operation corresponding to the first modification manner on a marking area of the first gesture input in the first message content to obtain a second message content after modification; and sending the second message content to a receive end device.

9 Claims, 6 Drawing Sheets

(51) Int. Cl.
  *H04L 51/04* (2022.01)
  *H04L 51/23* (2022.01)
  *G06F 40/166* (2020.01)
  *H04L 51/063* (2022.01)
  *H04M 1/72436* (2021.01)
  *G06F 3/01* (2006.01)
  *H04M 1/7243* (2021.01)

(56) References Cited

U.S. PATENT DOCUMENTS

| | | | | |
|---|---|---|---|---|
| 2012/0231770 | A1* | 9/2012 | Clarke | H04L 51/234 |
| | | | | 455/414.1 |
| 2013/0159878 | A1* | 6/2013 | Kim | G06F 3/0482 |
| | | | | 715/752 |
| 2014/0171153 | A1* | 6/2014 | Kienzle | G06F 3/0237 |
| | | | | 455/566 |
| 2014/0267094 | A1* | 9/2014 | Hwang | G06F 3/0488 |
| | | | | 345/173 |
| 2015/0074209 | A1* | 3/2015 | Liu | G06F 3/04883 |
| | | | | 709/206 |
| 2015/0113073 | A1 | 4/2015 | Chan et al. | |
| 2015/0264307 | A1* | 9/2015 | Chastney | G06F 3/04847 |
| | | | | 715/753 |
| 2015/0304251 | A1 | 10/2015 | Greenberg et al. | |
| 2017/0336928 | A1* | 11/2017 | Chaudhri | G06F 3/04886 |
| 2018/0004408 | A1 | 1/2018 | Bocking et al. | |
| 2018/0150458 | A1* | 5/2018 | Yoon | G06F 3/04883 |
| 2018/0302352 | A1* | 10/2018 | Chen | H04L 51/04 |
| 2019/0028417 | A1* | 1/2019 | Lee | G06F 13/00 |

FOREIGN PATENT DOCUMENTS

| | | |
|---|---|---|
| CN | 104360808 A | 2/2015 |
| CN | 105159527 A | 12/2015 |
| CN | 105827499 A | 8/2016 |
| CN | 110995919 A | 4/2020 |
| JP | 2014035770 A | 2/2014 |
| JP | 2015537289 A | 11/2017 |
| WO | 2017201326 A1 | 11/2017 |

OTHER PUBLICATIONS

First Examination Report issued in related Indian Application No. 202217032354 dated Oct. 20, 2022, 6 pages.
International Search Report issued in corresponding International Application No. PCT/CN2020/125773, dated Jan. 29, 2021, 4 pages.
First Office Action issued in related Chinese Application No. 201911087411.8, dated Oct. 10, 2020, 9 pages.
Notice of rejection issued in related Japanese Application No. 2022-525604 dated Apr. 25, 2023, 4 pages.

* cited by examiner

MESSAGE PROCESSING METHOD AND ELECTRONIC DEVICE

CROSS-REFERENCE TO RELATED APPLICATIONS

This application is a continuation of International Application No. PCT/CN2020/125773, filed Nov. 2, 2020, which claims priority to Chinese Patent Application No. 201911087411.8, filed Nov. 8, 2019. The entire contents of each of the above-referenced applications are expressly incorporated herein by reference.

TECHNICAL FIELD

The present disclosure relates to the field of communications technologies, and in particular, to a message processing method and an electronic device.

BACKGROUND

With popularity of electronic devices such as a mobile phone and a tablet computer, currently, social communication through an electronic device has become an indispensable part of people's daily life. Due to various reasons such as an input habit and an input sequence error, it is difficult to avoid a problem of a content input error during user communication. In the prior art, a modification solution is mainly proposed for a case that an error occurs in a sent message. For example, in a case that the user finds that message content needs to be edited again after sending the message, the user generally needs to withdraw the message within a specified time, and input and send the message again. For a message that has been input but not sent, the user needs to delete incorrect content one by one and then input them again.

It can be learned that in the prior art, in a process of performing communication through an electronic device, a modification operation performed by a user on message content is cumbersome.

SUMMARY

The present disclosure provides a message processing method and an electronic device, to resolve a problem in the prior art that a modification operation of a user on message content is cumbersome in a process of performing communication through an electronic device.

To resolve the foregoing technical problem, the present disclosure is implemented as follows:

According to a first aspect, an embodiment of the present disclosure provides a message processing method, applied to a transmit end device and including:
  receiving a first gesture input performed on first message content, where the first gesture input is a gesture corresponding to a preset modifier;
  determining a first modification manner corresponding to the first gesture input in response to the first gesture input, and performing a first modification operation corresponding to the first modification manner on a marking area of the first gesture input in the first message content to obtain modified second message content; and
  sending the second message content to a receive end device.

According to a second aspect, an embodiment of the present disclosure provides a message processing method, applied to a receive end device and including:
  receiving second message content obtained after first message content is modified, where the first message content is message content sent by a transmit end device; and
  displaying the second message content in a display location of the first message content in a message record.

According to a third aspect, an embodiment of the present disclosure provides an electronic device, where the electronic device is a transmit end device and includes:
  a first receiving module, configured to receive a first gesture input performed on first message content, where the first gesture input is a gesture corresponding to a preset modifier;
  a processing module, configured to: determine a first modification manner corresponding to the first gesture input in response to the first gesture input, and perform a first modification operation corresponding to the first modification manner on a marking area of the first gesture input in the first message content to obtain modified second message content; and
  a sending module, configured to send the second message content to a receive end device.

According to a fourth aspect, an embodiment of the present disclosure provides an electronic device, where the electronic device is a receive end device and includes:
  a third receiving module, configured to receive second message content obtained after first message content is modified, where the first message content is message content sent by a transmit end device; and
  a first display module, configured to display the second message content in a display location of the first message content in a message record.

According to a fifth aspect, an embodiment of the present disclosure provides an electronic device, including a processor, a memory, and a computer program that is stored in the memory and that can be run on the processor, and when the computer program is executed by the processor, the steps of the foregoing message processing method applied to the transmit end device are implemented.

According to a sixth aspect, an embodiment of the present disclosure provides an electronic device, including a processor, a memory, and a computer program that is stored in the memory and that can be run on the processor, and when the computer program is executed by the processor, the steps of the foregoing message processing method applied to the receive end device are implemented.

According to a seventh aspect, an embodiment of the present disclosure provides a computer-readable storage medium, where the computer-readable storage medium stores a computer program, and when the computer program is executed by a processor, the steps of the foregoing message processing method applied to the transmit end device are implemented.

According to an eighth aspect, an embodiment of the present disclosure provides a computer-readable storage medium, where the computer-readable storage medium stores a computer program, and when the computer program is executed by a processor, the steps of the foregoing message processing method applied to the receive end device are implemented.

In embodiments of the present disclosure, a first gesture input corresponding to a preset modifier is received and responded to, a first modification manner corresponding to the first gesture input is determined, a first modification operation corresponding to the first modification manner is performed on a marking area of the first gesture input in first message content to obtain modified second message content, and the modified second message content is sent to a receive end device, so that a modification operation can be simpler, and message content is modified by a user quickly and accurately, thereby improving user experience.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

DETAILED DESCRIPTION

To make the technical problems to be resolved, technical solutions, and advantages in the present disclosure clearer, the following provides detailed descriptions with reference to the accompanying drawings and specific embodiments.

Figure 1:
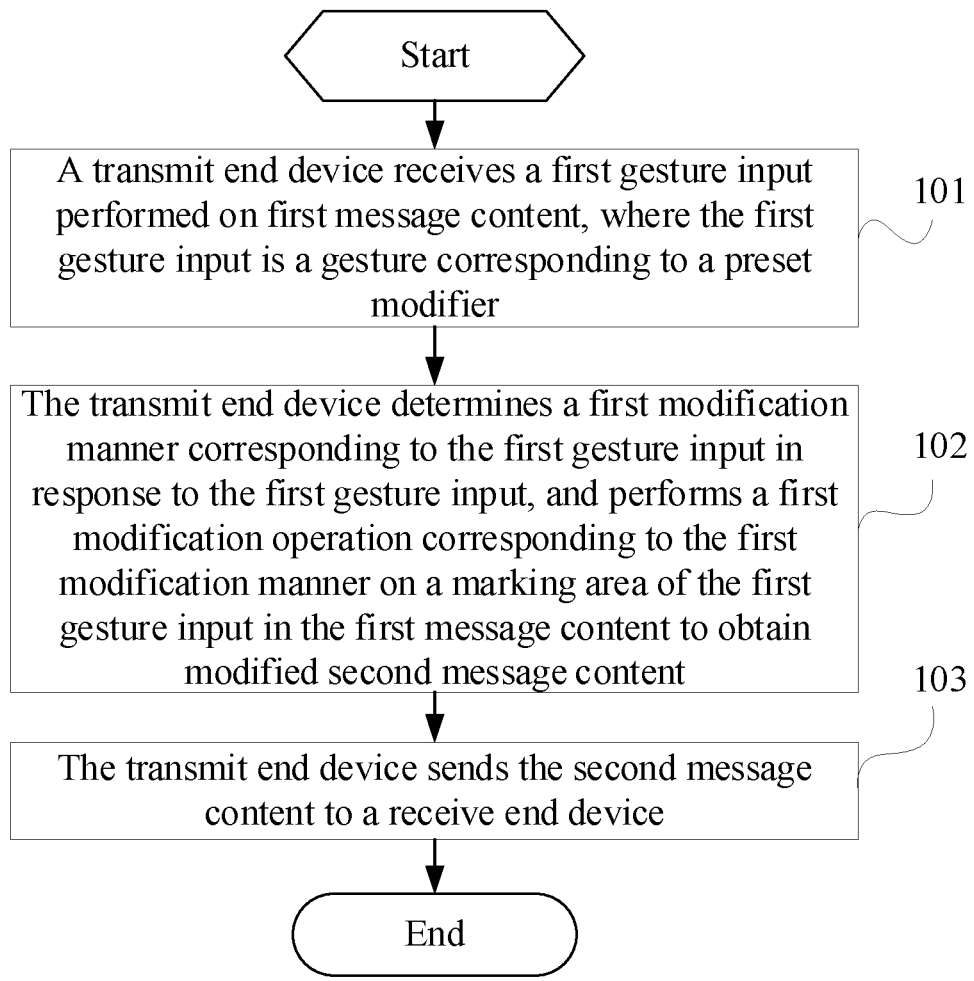
FIG. 1 is a schematic flowchart of a message processing method applied to a transmit end device according to an embodiment of the present disclosure.

Referring to FIG. 1, FIG. 1 is a schematic flowchart of a message processing method applied to a transmit end device according to an embodiment of the present disclosure. An embodiment of the present disclosure provides a message processing method, applied to a transmit end device, and the transmit end device is an electronic device. The message processing method may include the following steps.

Step 101: The transmit end device receives a first gesture input performed on first message content, where the first gesture input is a gesture corresponding to a preset modifier.

In this embodiment of the present disclosure, a user performs instant messaging with a first preset contact of a receive end device on a communication interface by using the transmit end device, to receive and send an instant messaging message. In this step, in a case that the user needs to modify input or sent message content (the first message content), the first gesture input is performed on the first message content on the communication interface of the transmit end device, so that the transmit end device receives the first gesture input. In this way, an area that needs to be modified can be accurately positioned in the first message content, that is, a marking area of the first gesture input, so that a corresponding modification operation is performed based on the first gesture input in a subsequent step, and the user can quickly modify message content. Herein, the first message content may be message content that is being input, or may be message content that is sent to the receive end device on the communication interface.

In this embodiment of the present disclosure, the user forms a corresponding gesture execution input based on the preset modifier, that is, the first gesture input, so that a modification operation can be simpler, fit into a paper file modification operation, and conform to an operation habit of the user. For example, the preset modifier may include at least one of a correction symbol, a deletion symbol, an addition symbol, an exchange symbol, a transfer symbol, a reservation symbol, and the like.

Step 102: The transmit end device determines a first modification manner corresponding to the first gesture input in response to the first gesture input, and performs a first modification operation corresponding to the first modification manner on a marking area of the first gesture input in the first message content to obtain modified second message content.

In this step, the transmit end device determines the first modification manner for the first message content in response to the first gesture input received in step 101, determines the marking area of the first gesture input in the first message content, and performs the first modification operation corresponding to the first modification manner on the marking area to obtain the second message content obtained after the first message content is modified. In this way, the corresponding modification manner is quickly determined based on the concise first gesture input, to quickly and accurately modify the first message content.

Step 103: The transmit end device sends the second message content to a receive end device.

In this step, the transmit end device sends the second message content obtained in step 102 to the receive end device, so that the receive end device receives and displays the second message content.

Herein, if the first message content is sent message content, a display location of the second message content on a communication interface of the receive end device is an original display location of the first message content, that is, the second message content is displayed in a display location of the first message content in a message record. It can be understood that, in this case, a display location of the second message content on a communication interface of the transmit end device is the display location of the first message content in the message record. If the first message content is sent message content, there is no time limit for modifying the first message content.

In this embodiment of the present disclosure, a first gesture input corresponding to a preset modifier is received and responded to, a first modification manner corresponding to the first gesture input is determined, a first modification operation corresponding to the first modification manner is performed on a marking area of the first gesture input in first message content to obtain modified second message content, and the modified second message content is sent to a receive end device, so that a modification operation can be simpler, and message content is modified by a user quickly and accurately, thereby improving user experience.

In some embodiments of the present disclosure, to facilitate accurate modification of the first message content by the user, before the transmit end device receives the first gesture input performed on the first message content in step 101, the method may further include the following step: the transmit end device a second gesture input performed on first message content on a communication interface; and displays the first message content through enlarging in response to the second gesture input. In this way, by performing the second gesture input on the first message content, the user can display the first message content through enlarging, so that the user can mark content that needs to be modified in the first message content. The second gesture input may include at least one of a slide input, a press input, a click input, a double-click input, a drag input, a pinch input, and an expand input.

In some embodiments of the present disclosure, that the transmit end device determines a first modification manner corresponding to the first gesture input in response to the first gesture input, and performs a first modification operation corresponding to the first modification manner on a marking area of the first gesture input in the first message content to obtain modified second message content in step 102 may include at least one of the following: the transmit end device determines that the first modification manner is correction modification in response to the first gesture input, displays at least one piece of corrected content associated with target content in the marking area of the first gesture input, and after a selection input performed on target corrected content in the at least one piece of corrected content is received, replaces the target content with the target corrected content; the transmit end device determines that the first modification manner is adjustment modification in response to the first gesture input, displays at least one piece of second adjustment content associated with first adjustment content, and after a selection input performed on target adjustment content in the at least one piece of second adjustment content is received, replaces the target content with the target adjustment content, where the first adjustment content is content obtained after the target content in the marking area of the first gesture input is adjusted; the transmit end device determines that the first modification manner is addition modification in response to the first gesture input, displays an input method interface, and after added content that is input on the input method interface is received, adds the added content to the marking area of the first gesture input in the first message content; and the transmit end device determines that the first modification manner is deletion modification in response to the first gesture input, and deletes the target content in the marking area of the first gesture input in the first message content.

Figure 3:
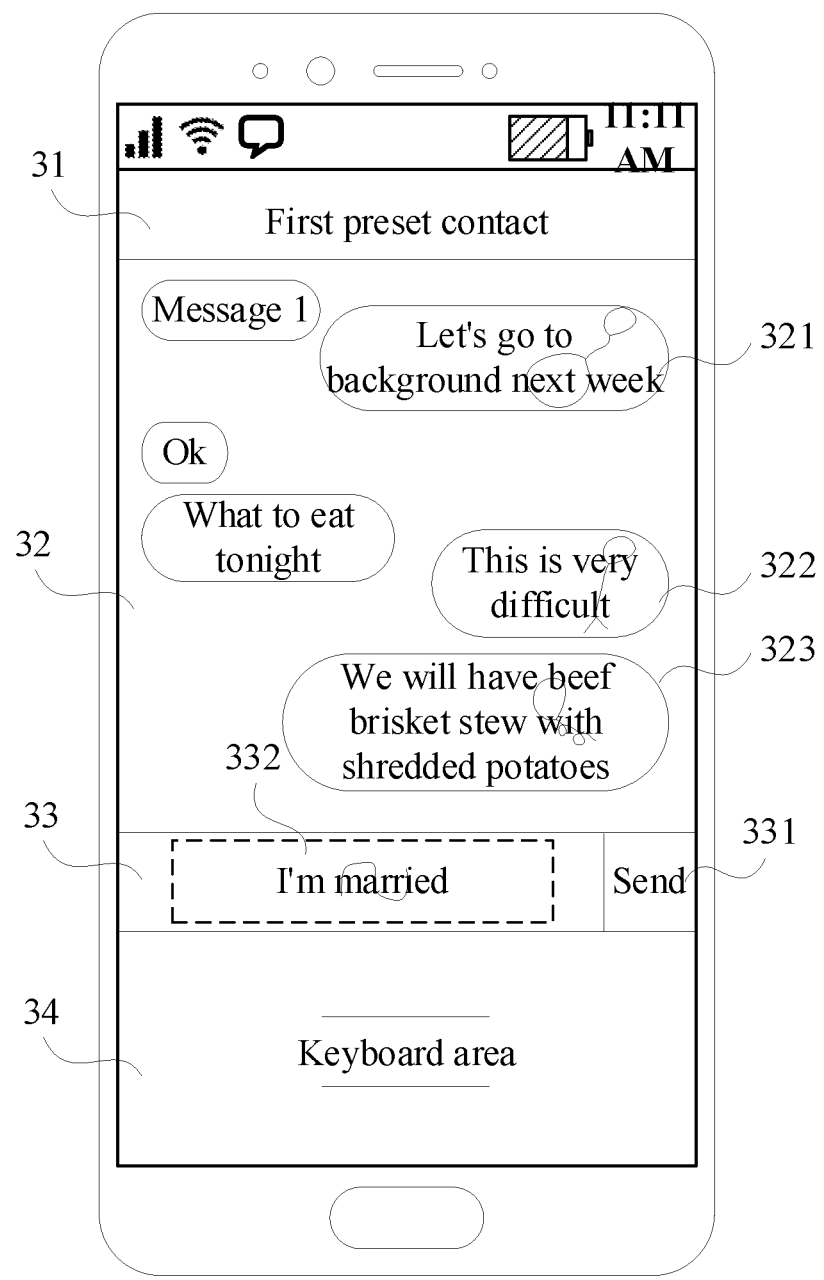
FIG. 3 is an example display diagram of a communication interface of implementing a message processing method by a transmit end device according to an embodiment of the present disclosure.

For example, as shown in FIG. 3, in "Let's go to background next week" in the shown message content 321, "Beijing" is input as "background" by mistake (because if you input pinyin "beijing", Chinese characters meaning background may be displayed by mistake). The user may perform the first gesture input by drawing a gesture corresponding to a correction symbol in the example. In this case, the transmit end device receives the first gesture input and displays at least one piece of corrected content associated with incorrect content (that is, target content in the message content 321), for example, pinyin "beijing" may refer to "background", for example, "Beijing", "North border", or "Microscope", so that the user can perform a selection input on target corrected content "Beijing" in the at least one piece of corrected content, so that the transmit end device replaces the target content "background" with the target corrected content "Beijing", to implement correction modification of the incorrect content. In "This is very difficult" in the shown message content 322, a word "question" is omitted by mistake. The user may perform the first gesture input by drawing a gesture corresponding to a shown addition symbol. In this case, the transmit end device receives the first gesture input and displays an input method interface, and the user may input added content "question" by using the input method interface, so that the transmit end device adds the added content "question", to implement addition modification of missing content. In "We will have beef brisket stew with shredded potatoes" in the shown message content 323, "potatoes" is input as "shredded potatoes" by mistake. The user may perform the first gesture input by drawing a gesture corresponding to a shown deletion symbol. In this case, the transmit end device receives the first gesture input, and deletes redundant content (target content in the message content 323) "shredded", to implement deletion modification of redundant content. In "I'm married" in the shown message content 332, "home" is input as "married" by mistake. The user may perform the first gesture input by drawing a gesture corresponding to a shown exchange symbol. In this case, the transmit end device receives the first gesture input, determines first adjustment content to be adjusted as content (target content in the message content 332) "married", and displays at least one piece of second adjustment content associated with the first adjustment content, for example, "home", "long-time", or "for long" (herein, an input character of "married" is "jh", and an input character of content such as "home" is "hj"). The user may perform a selection input on target adjustment content "home" in the at least one piece of second adjustment content, so that the transmit end device replaces the target content "married" with the target adjustment content "home", to implement adjustment modification on adjustment content.

In the foregoing example, a communication interface between a user and a first preset contact of the receive end device may include a contact information area 31 used to display contact information, a chat information area 32 used to display message content received or sent during communication with the first preset contact, an information input area 33 used to display message content being input, and an input method interface 34 used to perform a content input. To improve interaction experience in a communication process of the user, in a communication interface display process, the input method interface 34 may be hidden or displayed, and the input method interface 34 includes a keyboard area used for a user input. In addition, the information input area 33 may display a sending key 331, to send input message content. In some examples, the sending key 331 may be hidden or cancelled, or the sending key 331 may be integrated into the input method interface 34. Herein, the message content 321, 322, and 323 are displayed in the chat information area 32, and the message content 332 is displayed in the information input area 33.

In this embodiment of the present disclosure, considering impact of different input manners on message content, herein, for correction modification, the step of displaying at least one piece of corrected content associated with target content in the marking area of the first gesture input may include: determining a target input manner used on an input method interface, and determining and displaying, based on the target input manner, the at least one piece of corrected content associated with the target content. For adjustment modification, the step of displaying at least one piece of second adjustment content associated with first adjustment content may include: determining a target input manner used by an input method interface, and determining and displaying, based on the target input manner, the at least one piece of second adjustment content associated with the first adjustment content.

For example, if the target input manner is a Pinyin input manner, for correction modification, the step of displaying at least one piece of corrected content associated with target content in the marking area of the first gesture input may include: obtaining a first Pinyin character corresponding to the target content, and displaying at least one piece of corrected content associated with the first Pinyin character. For adjustment modification, the step of displaying at least one piece of second adjustment content associated with first adjustment content may include: obtaining a second Pinyin character corresponding to the first adjustment content, and displaying at least one piece of second adjustment content associated with the second Pinyin character. Herein, the first Pinyin character and the second Pinyin character may be determined based on a Pinyin character input manner accustomed to the user or a customary Pinyin character input manner of a related word. For example, if a customary Pinyin character input manner of a word such as "marriage" and "home" is input in a Pinyin initials manner, corresponding Pinyin characters are "jh" and "hj". If the Pinyin character accustomed to the user is a Pinyin complete spelling manner, Pinyin characters corresponding to words such as "background" and "Beijing" are "beijing".

In some embodiments of the present disclosure, step 103 in which the transmit end device sends the second message content to the receive end device may include the following step: if the first message content is sent message content, the transmit end device determines a reading status of the receive end device on the first message content; the transmit end device determines prompt information corresponding to the reading status based on the reading status; and the transmit end device sends the second message content and the prompt information to the receive end device. In this way, the receive end device can implement different display prompts by using the prompt information and based on the reading status of the first message content through the corresponding preset mark, thereby improving personalized experience and communication quality. Herein, the reading status includes a read state and an unread state. The prompt information includes first prompt information corresponding to a read state of the first message content and second prompt information corresponding to an unread state of the first message content. Considering that modification of message content in an unread state has little impact on the user of the receive end, the first prompt information may include indication information used to instruct the receive end device to display a preset mark, and the second prompt information may include indication information used to instruct the receive end device not to perform a mark prompt.

According to the message processing method applied to the transmit end device provided in this embodiment of the present disclosure, a first gesture input corresponding to a preset modifier is received and responded to, a first modification manner corresponding to the first gesture input is determined, a first modification operation corresponding to the first modification manner is performed on a marking area of the first gesture input in first message content to obtain modified second message content, and the modified second message content is sent to a receive end device, so that a modification operation can be simpler, and message content is modified by a user quickly and accurately, thereby improving user experience.

Figure 2:
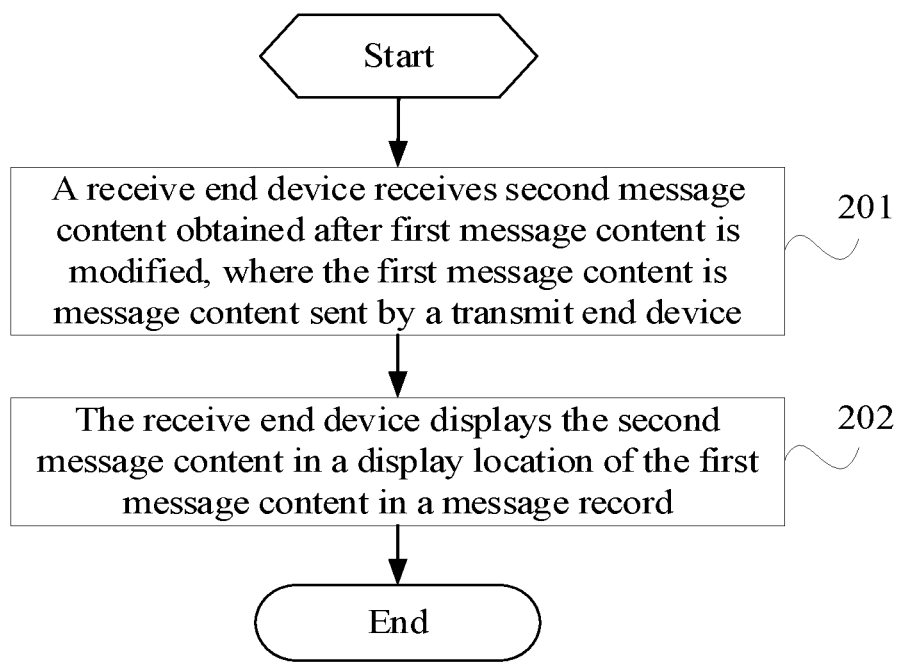
FIG. 2 is a schematic flowchart of a message processing method applied to a receive end device according to an embodiment of the present disclosure.

Referring to FIG. 2, FIG. 2 is a schematic flowchart of a message processing method applied to a receive end device according to an embodiment of the present disclosure. An embodiment of the present disclosure provides a message processing method, applied to a receive end device, and the receive end device is an electronic device. The message processing method may include the following steps.

Step 201: The receive end device receives second message content obtained after first message content is modified, where the first message content is message content sent by a transmit end device.

In this step, the transmit end device modifies the sent first message content, and sends the modified second message content to the receive end device, so that the receive end device receives the second message content, and displays the modified second message content in a subsequent step.

Step 202: The receive end device displays the second message content in a display location of the first message content in a message record.

In this step, the second message content received in step 201 is displayed in an original display location of the first message content on a communication interface of the receive end device, that is, the display location of the second message content on the communication interface of the receive end device is the display location of the first message content in the message record. In this way, browsing fluency of a user on message content is facilitated without changing the original display location of the first message content, thereby improving communication quality.

In this embodiment of the present disclosure, received second message content that is obtained after first message content is modified is displayed in a display location of the first message content in a message record, to facilitate browsing fluency of a user on message content without changing an original display location of the first message content, thereby improving communication quality.

In some embodiments of the present disclosure, in step 201, before the receive end device displays the second message content in the display location of the first message content in the message record, the message processing method may further include: the receive end device receives prompt information that is sent by the transmit end device and that corresponds to a reading status of the first message content. In step 202, after the receive end device displays the second message content in the display location of the first message content in the message record, the message processing method may further include: the receive end device displays a preset mark corresponding to the prompt information based on the prompt information. In this way, the receive end device can implement different display prompts by using the prompt information sent by the transmit end device and based on the reading status of the first message content through the corresponding preset mark, thereby improving personalized experience and communication quality. Herein, the reading status includes a read state and an unread state.

In addition, in some embodiments of the present disclosure, the receive end device may directly implement a display prompt based on the reading status of the first message content without sending the prompt information by using the transmit end device. That is, after step 201 in which the receive end device receives the second message content that is obtained after the first message content is modified, the receive end device may obtain the reading status of the first message content, and display the preset mark corresponding to the reading status based on the read status of the first message content.

In this embodiment of the present disclosure, considering that modification of message content in an unread state has little impact on a user of the receive end, if the prompt information is first prompt information corresponding to the read state of the first message content, the receive end device displays the corresponding preset mark based on the first prompt information or the read state, so that the user of the receive end can accurately learn of the modification of the message content in the read state. If the prompt information is second prompt information corresponding to the unread state of the first message content, the receive end device may perform no mark prompt based on the second prompt information or the unread state, so that the user of the receive end can be prevented from being confused with incorrect information content, and the user can accurately obtain correct message content.

In some embodiments of the present disclosure, if the prompt information is first prompt information corresponding to a read state of the first message content, that the receive end device displays a preset mark corresponding to the prompt information based on the prompt information includes at least one of the following: the receives end device displays a first prompt identifier in a first predetermined area of a communication interface, where the first prompt identifier is used to switch a display location of the communication interface to a display location of the second message content; and the receive end device displays a second prompt identifier in a second predetermined area of the second message content, where the first prompt identifier is used to prompt that the second message content is modified message content. Herein, the receive end device performs, based on the first prompt information, an identification prompt on the message content in the read state in a manner of displaying the first prompt identifier or the second prompt identifier, so that the user of the receive end can learn that a user of the transmit end modifies the message content in the read state, and the user can accurately learn the modified message content.

Figure 4:
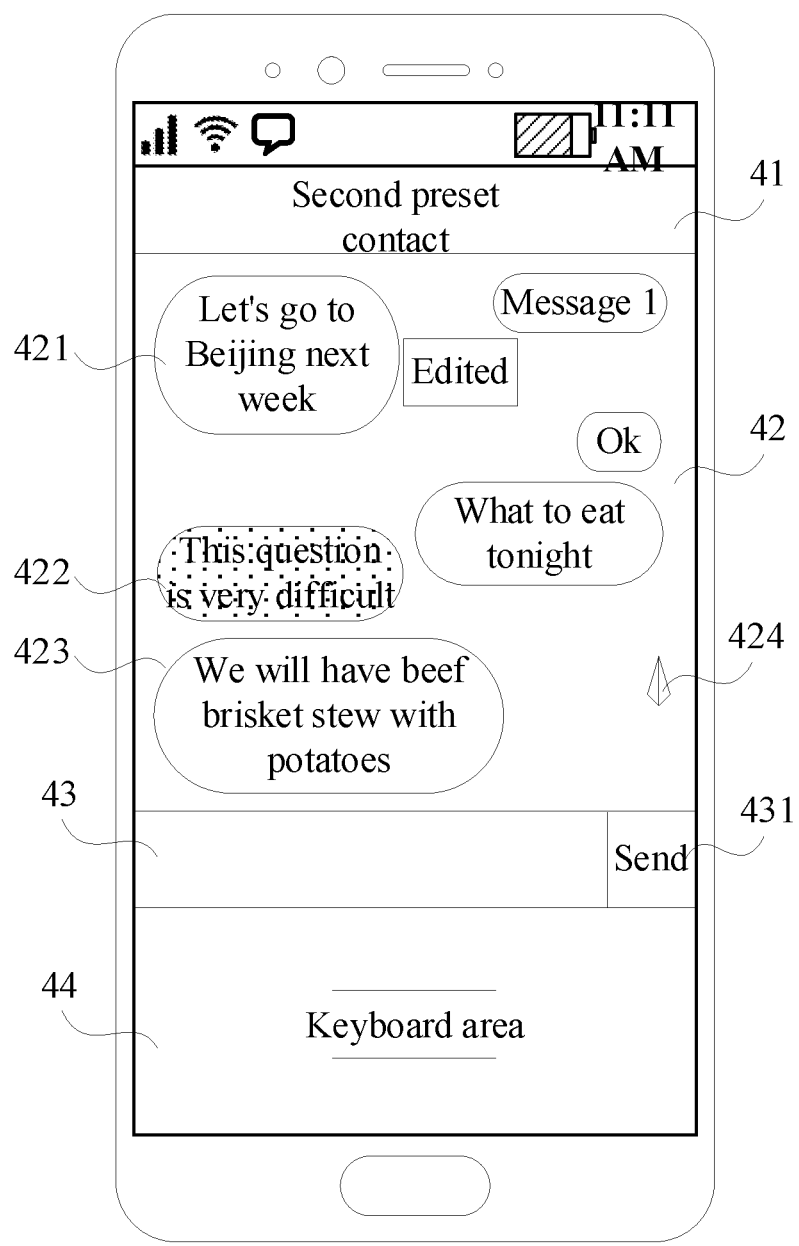
FIG. 4 is an example display diagram of a communication interface of implementing a message processing method by a receive end device according to an embodiment of the present disclosure.

In this embodiment of the present disclosure, the first prompt identifier may include a predetermined prompt icon, such as an arrow or a bubble. As shown in FIG. 4, an indication arrow 424 is used as the first prompt identifier, and a shape of the prompt icon may be preset. The second prompt identifier may be at least one of a text identifier and a background identifier. For example, in message content 421 shown in FIG. 4, a text identifier "edited" is used as the second prompt identifier, and a second predetermined area in the shown message content 421 is a right area of a message content display area used to display the message content. In addition, a display type of the text identifier may be preset. For example, the display type of the text identifier may include at least one of a predetermined font, a predetermined color background, a predetermined pattern background, and a predetermined graph. In message content 422 shown in FIG. 4, a background identifier (represented by a dot shadow in FIG. 4) is used as the second identifier, and a second predetermined area in the shown message content 422 is a message content display area used to display the message content. The background identifier includes at least one of a background color identifier, a background pattern identifier, an area display shape identifier of the message content display area, and the like. The message content 421 and 422 shown in FIG. 4 are message content in a read state, and message content 423 is message content in an unread state.

In the foregoing example, a communication interface between a user and a second preset contact of the transmit end device may include a contact information area 41 used to display contact information, a chat information area 42 used to display message content received or sent during communication with the second preset contact, an information input area 43 used to display message content being input, and an input method interface 44 used to perform a content input. To improve interaction experience in a communication process of the user, on a communication interface display process, the input method interface 44 may be hidden or displayed, and the input method interface 44 includes a keyboard area used for a user input. In addition, the information input area 43 may display a sending key 431, to send input message content. In some examples, the sending key 431 may be hidden or cancelled, or the sending key 431 may be integrated into the input method interface 44. Herein, the message content 421, 422, and 423 are displayed in the chat information area 42.

In some embodiments of the present disclosure, after the receive end device displays the corresponding preset mark based on the first prompt information or the read state, the following step may be further included: if a reading status of the second message content is a read state, cancelling the preset mark. In this way, the user of the receive end can be prevented from being confused by too many mark prompts, and therefore communication quality is not affected.

According to the message processing method applied to the receive end device provided in this embodiment of the present disclosure, received second message content that is obtained after first message content is modified is displayed in a display location of the first message content in a message record, to facilitate browsing fluency of a user on message content without changing an original display location of the first message content, thereby improving communication quality and user experience.

Figure 5:
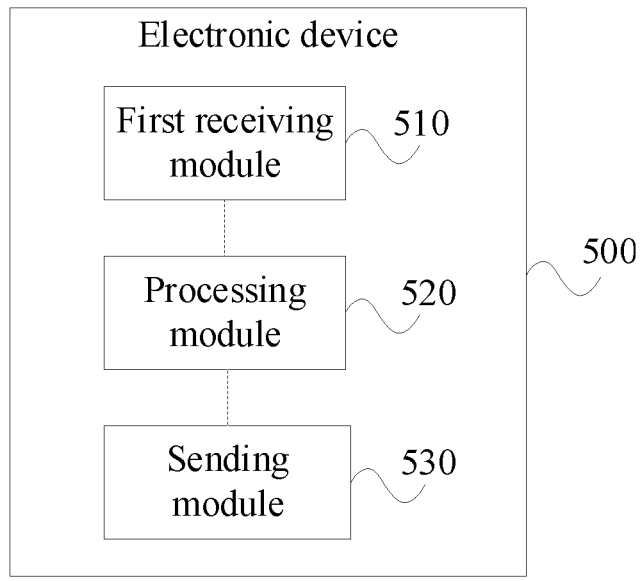
FIG. 5 is a first schematic structural diagram of an electronic device according to an embodiment of the present disclosure.

Based on the foregoing message processing method applied to the transmit end device, an embodiment of the present disclosure provides an electronic device for implementing the foregoing method. Referring to FIG. 5, FIG. 5 is a first schematic structural diagram of an electronic device according to an embodiment of the present disclosure. An embodiment of the present disclosure provides an electronic device 500, where the electronic device 500 is a transmit end device and may include:

- a first receiving module 510, configured to receive a first gesture input performed on first message content, where the first gesture input is a gesture corresponding to a preset modifier;
- a processing module 520, configured to: determine a first modification manner corresponding to the first gesture input in response to the first gesture input, and perform a first modification operation corresponding to the first modification manner on a marking area of the first gesture input in the first message content to obtain modified second message content; and
- a sending module 530, configured to send the second message content to a receive end device.

In some embodiments of the present disclosure, the electronic device 500 may further include a second receiving module and an enlarging module.

The second receiving module is configured to receive a second gesture input performed on first message content on a communication interface; and
  the enlarging module is configured to display the first message content through enlarging in response to the second gesture input.

In some embodiments of the present disclosure, the processing module 520 may include at least one of the following: a first processing unit, a second processing unit, a third processing unit, and a fourth processing unit.

The first processing unit is configured to: determine that the first modification manner is correction modification in response to the first gesture input, display at least one piece of corrected content associated with target content in the marking area of the first gesture input, and after a selection input performed on target corrected content in the at least one piece of corrected content is received, replace the target content with the target corrected content;

the second processing unit is configured to: determine that the first modification manner is adjustment modification in response to the first gesture input, display at least one piece of second adjustment content associated with first adjustment content, and after a selection input performed on target adjustment content in the at least one piece of second adjustment content is received, replace the target content with the target adjustment content, where the first adjustment content is content obtained after the target content in the marking area of the first gesture input is adjusted;

the third processing unit is configured to: determine that the first modification manner is addition modification in response to the first gesture input, display an input method interface, and after added content that is input on the input method interface is received, add the added content to the marking area of the first gesture input in the first message content; and the fourth processing unit is configured to: determine that the first modification manner is deletion modification in response to the first gesture input, and delete the target content in the marking area of the first gesture input in the first message content.

In some embodiments of the present disclosure, the sending module 530 may include a first determining unit, a second determining unit, and a sending unit.

The first determining unit is configured to: if the first message content is sent message content, determine a reading status of the receive end device on the first message content;

the second determining unit is configured to determine prompt information corresponding to the reading status based on the reading status; and the sending unit is configured to send the second message content and the prompt information to the receive end device.

The electronic device provided in this embodiment of the present disclosure can implement the processes implemented by the electronic device in the method embodiment in FIG. 1. To avoid repetition, details are not described herein again.

According to the electronic device provided in this embodiment of the present disclosure, a first receiving module and a processing module receive and respond to a first gesture input corresponding to a preset modifier, determine a first modification manner corresponding to the first gesture input, and perform a first modification operation corresponding to the first modification manner on a marking area of the first gesture input in first message content to obtain modified second message content; and a sending module sends the modified second message content to a receive end device, so that a modification operation can be simpler, and message content is modified by a user quickly and accurately, thereby improving user experience.

Figure 6:
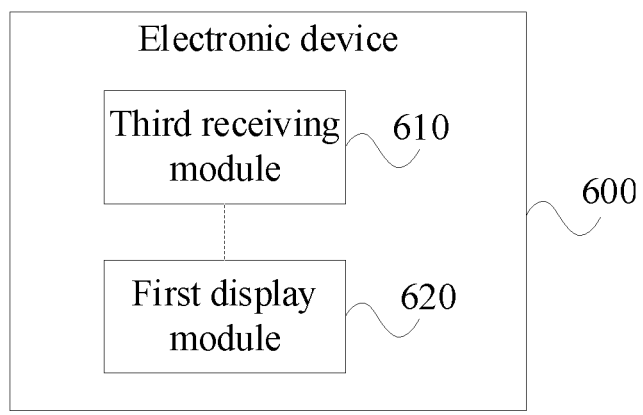
FIG. 6 is a second schematic structural diagram of an electronic device according to an embodiment of the present disclosure.

Based on the foregoing message processing method applied to the receive end device, an embodiment of the present disclosure provides an electronic device for implementing the foregoing method. Referring to FIG. 6, FIG. 6 is a second schematic structural diagram of an electronic device according to an embodiment of the present disclosure. An embodiment of the present disclosure provides an electronic device 600. The electronic device 600 is a receive end device, and may include a third receiving module 610 and a first display module 620.

The third receiving module 610 is configured to receive second message content obtained after first message content is modified, where the first message content is message content sent by a transmit end device; and the first display module 620 is configured to display the second message content in a display location of the first message content in a message record.

In some embodiments of the present disclosure, the electronic device 600 may further include a fourth receiving module and a second display module.

The fourth receiving module is configured to receive prompt information that is sent by the transmit end device and that corresponds to a reading status of the first message content; and the second display module is configured to display a preset mark corresponding to the prompt information based on the prompt information.

In some embodiments of the present disclosure, if the prompt information is first prompt information corresponding to a read state of the first message content, the second display module may include at least one of the following: a first display unit and a second display unit.

The first display unit is configured to display a first prompt identifier in a first predetermined area of a communication interface, where the first prompt identifier is used to switch a display location of the communication interface to a display location of the second message content; and the second display unit is configured to display a second prompt identifier in a second predetermined area of the second message content, where the first prompt identifier is used to prompt that the second message content is modified message content.

The electronic device provided in this embodiment of the present disclosure can implement the processes implemented by the electronic device in the method embodiment in FIG. 2. To avoid repetition, details are not described herein again.

According to the electronic device provided in this embodiment of the present disclosure, a first display module displays, in a display location of the first message content in a message record, received second message content obtained after first message content is modified, to facilitate browsing fluency of a user on message content without changing an original display location of the first message content, thereby improving communication quality and user experience.

Figure 7:
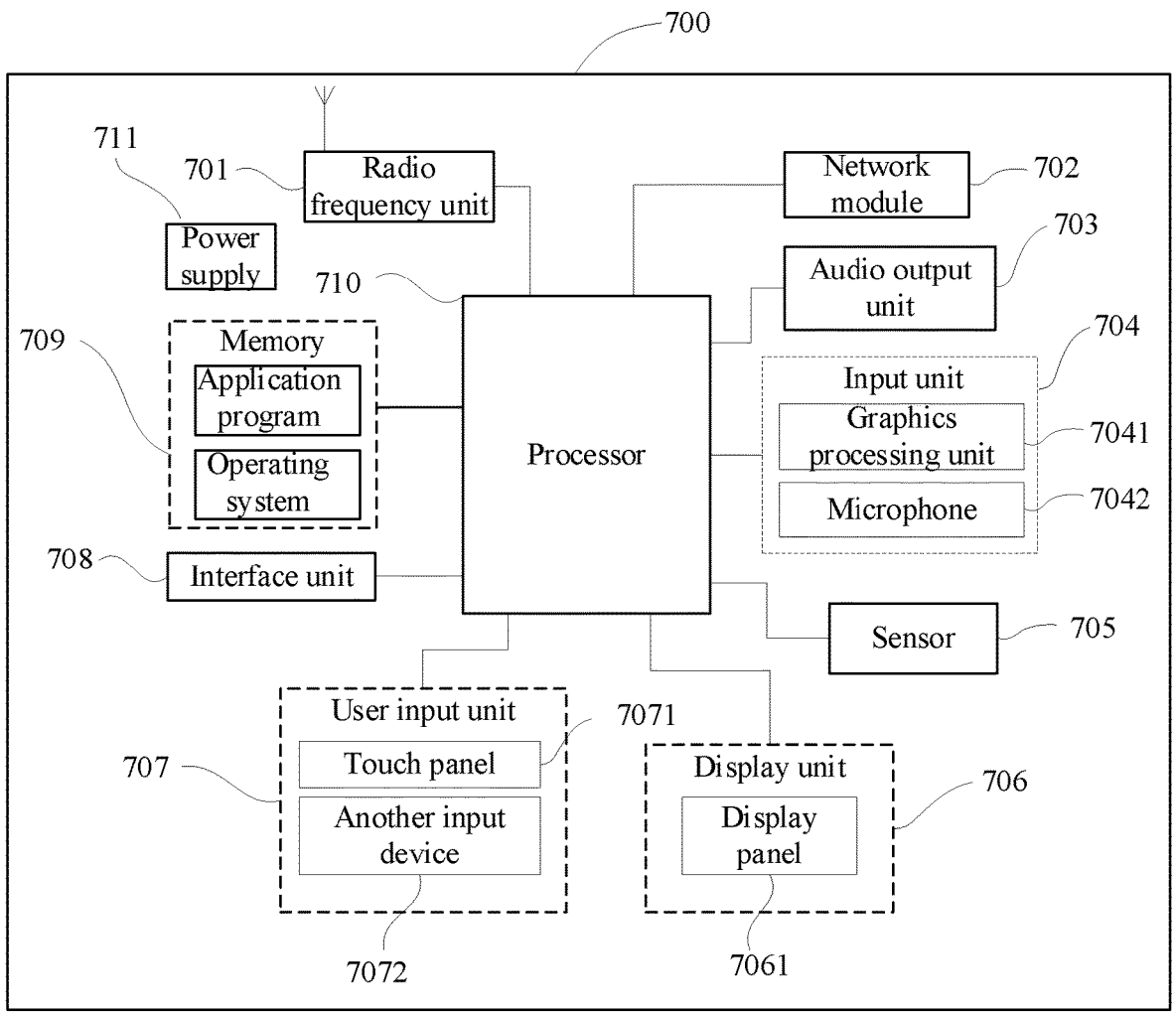
FIG. 7 is a schematic structural diagram of hardware of an electronic device according to an embodiment of the present disclosure.

FIG. 7 is a schematic structural diagram of hardware of an electronic device according to the embodiments of the present disclosure.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the electronic device shown in FIG. 7 constitutes no limitation on the electronic device, and the electronic device may include more or fewer components than those shown in the figure, or have a combination of some components, or have a different component arrangement. In this embodiment of the present disclosure, the electronic device includes but is not limited to a mobile phone, a tablet computer, a notebook computer, a palmtop computer, an in-vehicle terminal, a wearable device, a pedometer, and the like.

In some embodiments of the present disclosure, the electronic device is a transmit end device for receiving and sending information, the user input unit 707 is configured to receive a first gesture input performed on first message content, where the first gesture input is a gesture corresponding to a preset modifier; the processor 710 is configured to: determine a first modification manner corresponding to the first gesture input in response to the first gesture input, and perform a first modification operation corresponding to the first modification manner on a marking area of the first gesture input in the first message content to obtain modified second message content; and the radio frequency unit 701 is configured to send the second message content to a receive end device. In this embodiment of the present disclosure, a modification operation can be simpler, and message content is modified by a user quickly and accurately, thereby improving user experience.

In some embodiments of the present disclosure, the electronic device is a receive end device for receiving and sending information. The radio frequency unit 701 is configured to receive second message content obtained after first message content is modified, where the first message content is message content sent by a transmit end device; and the display unit 706 is configured to display the second message content in a display location of the first message content in a message record. In this embodiment of the present disclosure, browsing fluency of a user on message content can be implemented without changing an original display location of the first message content, thereby improving communication quality and user experience.

It should be understood that, in this embodiment of the present disclosure, the radio frequency unit 701 may be configured to receive and send information or a signal in a call process. Specifically, after receiving downlink data from a base station, the radio frequency unit 701 sends the downlink data to the processor 710 for processing. In addition, the radio frequency unit 701 sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may communicate with a network and another device through a wireless communication system.

The electronic device provides wireless broadband Internet access for the user by using the network module 702, for example, helping the user to send and receive an e-mail, brows a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received voice, or a message received voice) related to a specific function implemented by the electronic device 700. The audio output unit 703 includes a speaker, a buzzer, a telephone receiver, and the like.

The input unit 704 is configured to receive an audio signal or a video signal. The input unit 704 may include a Graphics Processing Unit (GPU) 7041 and a microphone 7042, and the graphics processing unit 7041 processes image data of a still picture or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive a sound and can process such sound into audio data. Processed audio data may be converted, in a call mode, into a format that can be sent to a mobile communication base station by using the radio frequency unit 701 for output.

The electronic device 700 further includes at least one sensor 705 such as a light sensor, a motion sensor, and another sensor. Specifically, the light sensor includes an ambient light sensor and a proximity sensor. The ambient light sensor may adjust luminance of the display panel 7061 based on brightness of ambient light. The proximity sensor may turn off the display panel 7061 and/or backlight when the electronic device 700 moves to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by a user or information provided for a user. The display unit 706 may include a display panel 7061. The display panel 7061 may be configured in a form of a Liquid Crystal Display (LCD), an Organic Light-Emitting Diode (OLED), or the like.

The user input unit 707 may be configured to: receive input digital or character information, and generate key signal input related to a user setting and function control of the electronic device. Specifically, the user input unit 707 includes a touch panel 7071 and another input device 7072. The touch panel 7071 is also referred to as a touchscreen, and may collect a touch operation performed by a user on or near the touch panel 7071 (such as an operation performed by a user on the touch panel 7071 or near the touch panel 7071 by using any proper object or accessory, such as a finger or a stylus). The touch panel 7071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 710, and can receive and execute a command sent by the processor 710. In addition, the touch panel 7071 may be of a resistive type, a capacitive type, an infrared type, a surface acoustic wave type, or the like. The user input unit 707 may include the another input device 7072 in addition to the touch panel 7071. Specifically, the input another device 7072 may include but is not limited to a physical keyboard, a functional button (such as a volume control button or a power on/off button), a trackball, a mouse, and a joystick. Details are not described herein.

Further, the touch panel 7071 may cover the display panel 7061. When detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, although the touch panel 7071 and the display panel 7061 are used as two independent parts to implement input and output functions of the electronic device, in some embodiments, the touch panel 7071 and the display panel 7061 may be integrated to implement the input and output functions of the electronic device. This is not specifically limited herein.

The interface unit 708 is an interface for connecting an external apparatus with the electronic device 700. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 708 may be configured to receive input (for example, data information and power) from an external apparatus and transmit the received input to one or more elements in the electronic device 700 or may be configured to transmit data between the electronic device 700 and an external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 709 may include a high-speed random access memory, and may further include a nonvolatile memory, for example, at least one magnetic disk storage device, a flash storage device, or another volatile solid-state storage device.

The processor 710 is a control center of the electronic device, connects all parts of the entire electronic device by using various interfaces and lines, and performs various functions of the electronic device and data processing by running or executing a software program and/or a module that are/is stored in the memory 709 and by invoking data stored in the memory 709, to overall monitor the electronic device. The processor 710 may include one or more processing units. In some embodiments, an application processor and a modem processor may be integrated into the processor 710. The application processor mainly processes an operating system, a user interface, an application program, and the like. The modem processor mainly processes wireless communications. It can be understood that, alternatively, the modem processor may not be integrated into the processor 710.

The electronic device 700 may further include the power supply 711 (such as a battery) that supplies power to each component. In some embodiments, the power supply 711 may be logically connected to the processor 710 by using a power supply management system, so as to implement functions such as charging and discharging management, and power consumption management by using the power supply management system.

In addition, the electronic device 700 includes some function modules not shown, and details are not described herein.

An embodiment of the present disclosure further provides an electronic device, including: a processor 710, a memory 709, and a computer program that is stored in the memory 709 and that can be run on the processor 710. When the computer program is executed by the processor 710, the foregoing processes of the message processing method embodiment applied to the transmit end device are implemented, and a same technical effect can be achieved. To avoid repetition, details are not described herein again.

An embodiment of the present disclosure further provides an electronic device, including: a processor 710, a memory 709, and a computer program that is stored in the memory 709 and that can be run on the processor 710. When the computer program is executed by the processor 710, the foregoing processes of the message processing method embodiment applied to the receive end device are implemented, and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the message processing method embodiment applied to the transmit end device are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the foregoing processes of the message processing method embodiment applied to the receive end device are implemented and a same technical effect can be achieved. To avoid repetition, details are not described herein again. The computer-readable storage medium includes a Read-Only Memory (ROM), a Random Access Memory (RAM), a magnetic disk, or an optical disc.

It should be noted that, in this specification, the terms "include", "comprise", or any other variants are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. The technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure is described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method for message processing, performed by a transmit end device, comprising:
   receiving a first gesture input performed on a first message content after the first message content is sent to a receive end device, wherein the first gesture input is a gesture corresponding to a preset modifier;
   determining a first modification manner corresponding to the first gesture input in response to the first gesture input, and performing a first modification operation corresponding to the first modification manner on a marking area of the first gesture input in the first message content to obtain a second message content after modifying the first message content;
   determining a reading status of the receive end device on the first message content;
   determining prompt information corresponding to the reading status based on the reading status; and
   sending the second message content and the prompt information to the receive end device.

2. The method according to claim 1, further comprising:
   receiving a second gesture input performed on the first message content on a communication interface; and
   displaying the first message content through enlarging in response to the second gesture input.

3. The method according to claim 1, wherein the determining the first modification manner corresponding to the first gesture input in response to the first gesture input, and performing the first modification operation corresponding to the first modification manner on the marking area of the first gesture input in the first message content to obtain the second message content after modifying the first message content comprise at least one of the following:
   determining that the first modification manner is a correction modification in response to the preset modifier being a correction symbol, displaying at least one piece of corrected content associated with a target content in the marking area of the first gesture input, and after a selection input is performed on a target corrected content in the at least one piece of corrected content is received, replacing the target content with the target corrected content;
   determining that the first modification manner is adjustment modification in response to the preset modifier being an exchange symbol, displaying at least one piece of second adjustment content associated with a first adjustment content, and after a selection input performed on a target adjustment content in the at least one piece of second adjustment content is received, replacing the target content with the target adjustment content, wherein the first adjustment content is content obtained after the target content in the marking area of the first gesture input is adjusted;
   determining that the first modification manner is addition modification in response to the preset modifier being an addition symbol, displaying an input method interface, and after added content that is input on the input method interface is received, adding the added content to the marking area of the first gesture input in the first message content; or determining that the first modification manner is deletion modification in response to the preset modifier being a deletion symbol, and deleting the target content in the marking area of the first gesture input in the first message content.

4. A non-transitory computer-readable storage medium, storing a computer program, when the computer program is executed by a processor, performs operations comprising:
   receiving a first gesture input performed on a first message content after the first message content is sent to a receive end device, wherein the first gesture input is a gesture corresponding to a preset modifier;
   determining a first modification manner corresponding to the first gesture input in response to the first gesture input, and performing a first modification operation corresponding to the first modification manner on a marking area of the first gesture input in the first message content to obtain a second message content after modifying the first message content;
   determining a reading status of the receive end device on the first message content;
   determining prompt information corresponding to the reading status based on the reading status; and
   sending the second message content and the prompt information to the receive end device.

5. The non-transitory computer-readable storage medium according to claim 4, wherein the operations further comprise:
   receiving a second gesture input performed on the first message content on a communication interface; and
   displaying the first message content through enlarging in response to the second gesture input.

6. The non-transitory computer-readable storage medium according to claim 4, wherein the determining the first modification manner corresponding to the first gesture input in response to the first gesture input, and performing the first modification operation corresponding to the first modification manner on the marking area of the first gesture input in the first message content to obtain modified second message content comprise at least one of the following:
   determining that the first modification manner is a correction modification in response to the preset modifier being a correction symbol, displaying at least one piece of corrected content associated with a target content in the marking area of the first gesture input, and after a selection input is performed on a target corrected content in the at least one piece of corrected content is received, replacing the target content with the target corrected content;
   determining that the first modification manner is adjustment modification in response to the preset modifier being an exchange symbol, displaying at least one piece of second adjustment content associated with a first adjustment content, and after a selection input performed on a target adjustment content in the at least one piece of second adjustment content is received, replacing the target content with the target adjustment content, wherein the first adjustment content is content obtained after the target content in the marking area of the first gesture input is adjusted;
   determining that the first modification manner is addition modification in response to the preset modifier being an addition symbol, displaying an input method interface, and after added content that is input on the input method interface is received, adding the added content to the marking area of the first gesture input in the first message content; or determining that the first modification manner is deletion modification in response to the preset modifier being a deletion symbol, and deleting the target content in the marking area of the first gesture input in the first message content.

7. An electronic device, comprising:
a memory storing a computer program; and
a processor coupled to the memory and configured to execute the computer program to perform operations comprising:
receiving a first gesture input performed on a first message content after the first message content is sent to a receive end device, wherein the first gesture input is a gesture corresponding to a preset modifier;
determining a first modification manner corresponding to the first gesture input in response to the first gesture input, and performing a first modification operation corresponding to the first modification manner on a marking area of the first gesture input in the first message content to obtain a second message content after modifying the first message content;
determining a reading status of the receive end device on the first message content;
determining prompt information corresponding to the reading status based on the reading status; and
sending the second message content and the prompt information to the receive end device.

8. The electronic device according to claim 7, wherein the operations further comprise:
receiving a second gesture input performed on the first message content on a communication interface; and
displaying the first message content through enlarging response to the second gesture input.

9. The electronic device according to claim 7, wherein the determining the first modification manner corresponding to the first gesture input in response to the first gesture input, and performing the first modification operation corresponding to the first modification manner on the marking area of the first gesture input in the first message content to obtain the second message content after modifying the first content comprise at least one of the following:

determining that the first modification manner is a correction modification in response to the preset modifier being a correction symbol, displaying at least one piece of corrected content associated with a target content in the marking area of the first gesture input, and after a selection input is performed on a target corrected content in the at least one piece of corrected content is received, replacing the target content with the target corrected content;

determining that the first modification manner is adjustment modification in response to the preset modifier being an exchange symbol, displaying at least one piece of second adjustment content associated with a first adjustment content, and after a selection input performed on a target adjustment content in the at least one piece of second adjustment content is received, replacing the target content with the target adjustment content, wherein the first adjustment content is content obtained after the target content in the marking area of the first gesture input is adjusted;

determining that the first modification manner is addition modification in response to the preset modifier being an addition symbol, displaying an input method interface, and after added content that is input on the input method interface is received, adding the added content to the marking area of the first gesture input in the first message content; or determining that the first modification manner is deletion modification in response to the preset modifier being a deletion symbol, and deleting the target content in the marking area of the first gesture input in the first message content.

* * * * *